United States Patent [19]
Leigh, Jr.

[11] 3,913,529
[45] Oct. 21, 1975

[54] FEEDING PEN FOR HAYSTACKS

[76] Inventor: Richard Eugene Leigh, Jr., 1613 Medical Towers, Houston, Tex. 77025

[22] Filed: June 20, 1974

[21] Appl. No.: 481,053

[52] U.S. Cl. .................................................. 119/60
[51] Int. Cl.² .......................................... A01K 5/00
[58] Field of Search ................ 119/60, 58, 51 R, 16

[56] References Cited
UNITED STATES PATENTS

| | | | |
|---|---|---|---|
| 2,815,001 | 12/1957 | Hanson | 119/58 |
| 3,063,416 | 11/1962 | Elstner | 119/51 R |
| 3,067,723 | 12/1962 | Norwood | 119/58 |
| 3,620,192 | 11/1971 | Taylor | 119/16 |

*Primary Examiner*—Hugh R. Chamblee
*Attorney, Agent, or Firm*—Fulbright & Jaworski

[57] ABSTRACT

A feeding pen for haystacks that minimizes the amount of hay which is not consumed by cattle or other animals. The feeding pen consists of four sides, three of which are rigidly attached together while the fourth side is movable with respect to the others. As the animals consume the hay on the movable side of the pen, they push inwardly on the movable side to gain access to more hay. Additionally, animals on the other sides may move the rigid portion which is positioned upon skids.

9 Claims, 3 Drawing Figures

FEEDING PEN FOR HAYSTACKS

CROSS-REFERENCE TO RELATED APPLICATIONS

None

BACKGROUND OF THE INVENTION

Under present conditions wherein the need to economize is evident, the need for a device which will allow cattle and other animals to eat hay with a minimum amount of waste is readily apparent. Various feeding racks are available and some are adjustable; however, until now, no feeding rack existed which could be adjusted by the animals using it.

Applicant presently is aware of existing patents in the field of the art, including U.S. Pat. Nos. 479,680 (Thompson, 1892); 2,491,577 (Olinger, 1949); 3,135,267 (Liebig, 1964); 2,533,984 (Anson, 1950); 2,729,196 (Breitenbach, 1956); and 3,336,908 (Swanson, 1967).

SUMMARY OF THE INVENTION

The present invention provides a four-sided feeding pen for haystacks by which cattle or other hay-consuming animals may reduce the size of the feeding area as the hay is consumed. Use of the feeding pen results in a minimal amount of non-consumed hay. In addition, the feeding pen is designed for easy maneuverability.

It is, therefore, an object of the present invention to provide a four-sided feeding pen for haystacks which cattle or other animals may reduce in size as they consume the hay, wherein the feeding pen includes two opposed side members placed upon skids for ease of maneuverability, a third side member rigidly attached to one end of each of the first two side members, and a fourth side member slideably engaging the first two side members and slideable substantially the entire length of the first two side members.

Another object of the present invention is the provision of slideable locks which movably connect the fourth side member of the feeding pen to the first two side members.

A further object of the present invention is to provide corner reinforcing members between the first two and third side members.

Still other and further objects, features and advantages will be apparent from the following description of a presently preferred embodiment of the invention, given for the purpose of disclosure and taken in connection with the accompanying drawings.

BRIEF DESCRIPTION OF THE DRAWINGS

In the drawings forming a part of the disclosure herein, like character references designate like parts throughout the several views, wherein.

DESCRIPTION OF THE PREFERRED EMBODIMENT

Figure 1:
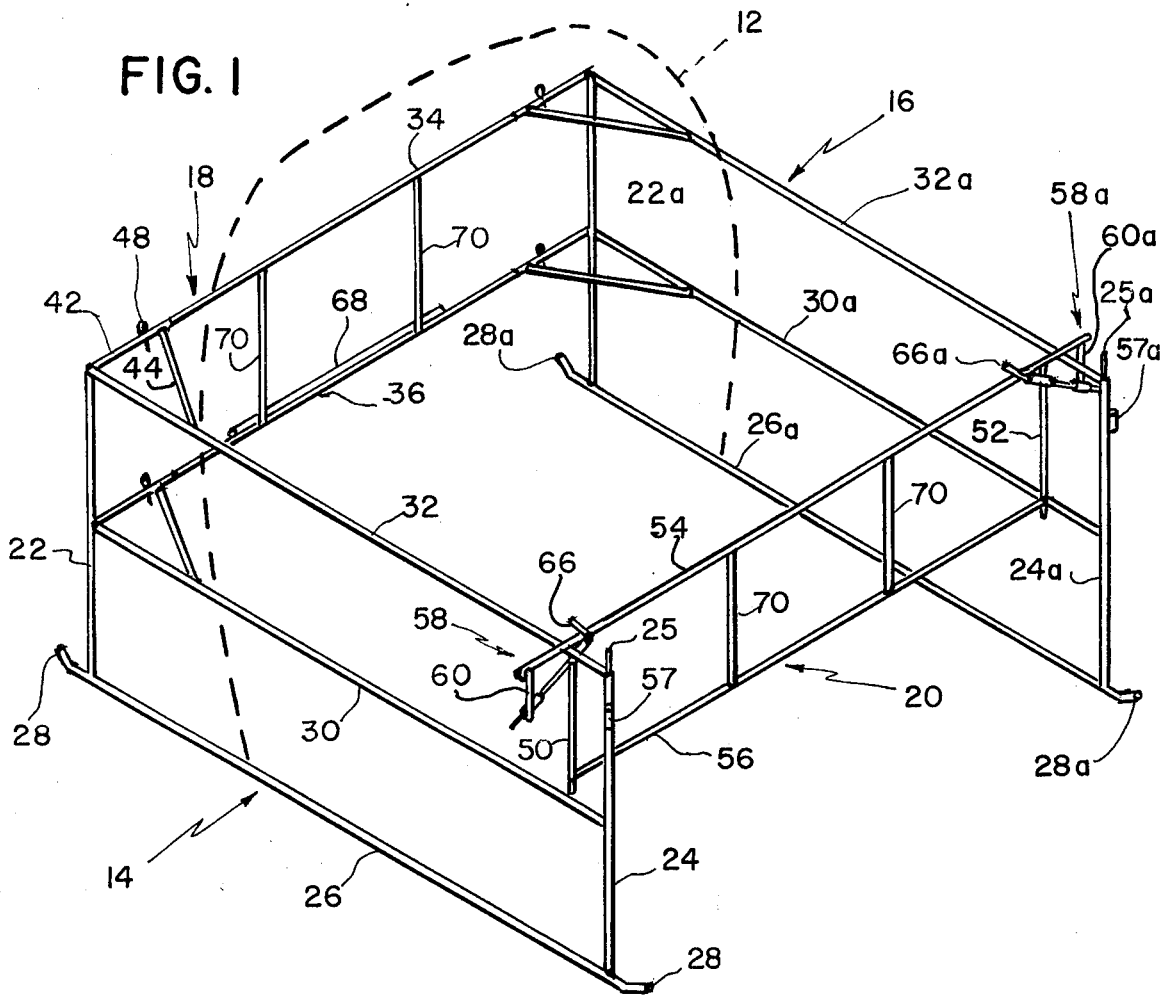
FIG. 1 is a perspective view of the feeding pen for a haystack shown in dotted outline.

The present invention provides a feeding pen for haystacks which may be reduced in area by cattle or other animals as they consume the outward portions of the haystack. A perspective of the preferred embodiment of the pen 10 is shown in FIG. 1, surrounding a haystack indicated by dotted outline 12. The pen includes four side members, namely, first and second side members 14 and 16 which are directly opposite each other, a third side member 18 which is rigidly attached to one end of each of the first and second side members 14 and 16, and a fourth side member 20 which is slideably attached to the first and second side members 14 and 16 and which may be moved virtually the entire length of the members 14 and 16.

The first side member 14 includes two vertical bars 22 and 24, to which is secured a skid rail 26 that serves as the base for the vertical bars 22 and 24 and has upturned ends 28. Two horizontal bars 30 and 32 are secured to and between the vertical bars 22 and 24. The second side member 16 is of similar construction, like parts being designated by similar reference numerals but with the character "a".

Figure 3:
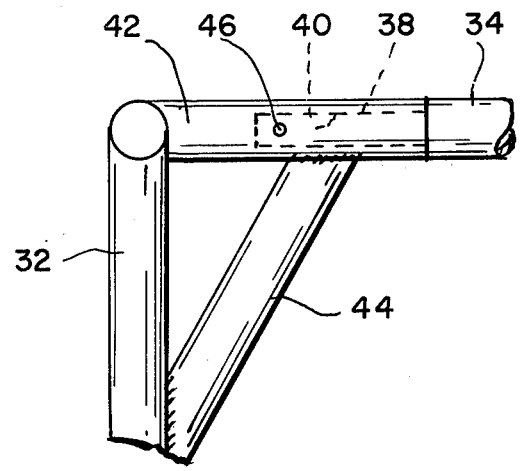
FIG. 3 is a partial plan view showing the reinforced corner of one of the two first opposite sides.

The third side member 18 includes two horizontal bars, an upper horizontal bar 34 and a lower horizontal bar 36. Although the bars 34 and 36 may be secured directly to the vertical bars 22 and 22a, respectively, preferably they are attached so as to be easily disassembled for movability, storage and the like. Thus, as illustrated in FIG. 3, the horizontal bar 34 of the member 18 is provided with a swaged or male end portion 38 that is disengageably received by a corresponding tubular or female portion 40 of a rod 42. The rod 42 in turn is secured to the vertical bar 22 or, if desired, to the horizontal bar 32 of the first side member 14. Preferably a diagonal bar 44 is secured such as by welding to the rod 42 and bar 32 for reinforcement purposes. A hole 46 through the female portion 40 of the rod 42 mates with a similar hole (not shown) of the male portion 38 of the bar 34 so that a pin 48 (as shown in FIG. 1) locks the bar 34 to the rod 42. It will be understood, of course, that the other end of the bar 34 and the ends of the bar 36 are similarly constructed as shown in FIG. 1.

The fourth side member 20 is slideably attached to side members 14 and 16 and may be moved virtually the entire length of the latter two members. The fourth side member 20 includes two vertical bars 50 and 52 to which are connected an upper horizontal bar 54 which is located upon and extends over the upper horizontal bars 32 and 32a of the first and second side members, respectively, and a lower second horizontal bar 56. A sliding lock mechanism 58 as shown in FIG. 2 movably attaches the fourth side member 20 to the first (14) and second (16) side members.

Figure 2:
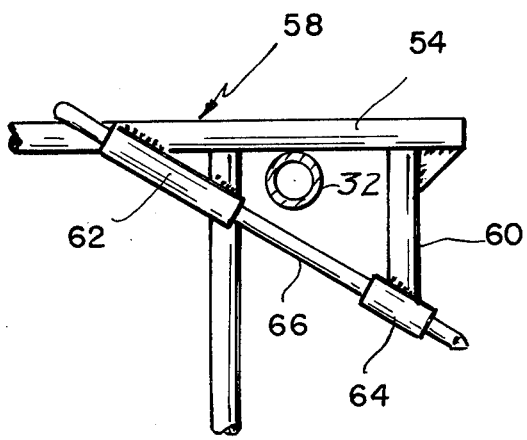
FIG. 2 is a partial elevational view of the slideable lock portion of the fourth side member allowing slideable connection to the first two side members.

Referring to FIG. 2, the lock 58 is comprised of a vertical bar 60 which extends downward from the outer end of the horizontal bar 54, cylindrical attachments 62 and 64 which are attached to the upper horizontal bar 54 and the vertical bar 60, respectively, and an "L-shaped" rod 66 which is removably inserted through the cylindrical attachments 62 and 64 to complete the encirclement of the horizontal bar 32 of the first side member. It is preferred that the rod 66 be made of steel as such material adds sturdiness and durability. An identical sliding lock mechanism 58a is connected to the opposite end of the fourth side member 20 to enclose and lock the horizontal bar 32a. Preferably, the locking devices 58 and 58a of the sliding side member 20 are sized and spaced so that the sliding side member 20 can swing no more than 15° or 20° in either direction. Such limitation prevents a mature animal from entering and being trapped within the pen. Extensions 25 and 25a of vertical bars 24 and 24a above horizontal bars 32 and 32a are used to prevent the fourth side member 20 from sliding off the horizontal bars 32 and 32a.

Pieces of pipe 57 and 57a are located below the extensions 25 and 25a and are attached to the vertical bars 24 and 24a, respectively. The pieces of pipe 57 and 57a are of sufficient diameter to accept rods 66 and 66a. Placement of the rods 66 and 66a in the pieces of pipe 57 and 57a, respectively, when the rods are not being used to complete the encirclement of horizontal bars 32 and 32a, prevents loss of such rods.

For the purpose of reinforcing the lower horizontal bar 36 of the third side member 18, an additional bar 68 may be attached next to said bar 36. The additional bar 68 provides extra rigidity which allows the pen to withstand the force exerted by a tractor when moving the pen. Reinforcing bars 70 may be added between the upper and lower horizontal bars 34 and 36 and 54 and 56, respectively, for additionally increasing the rigidity of the pen.

Due to the extreme pressures placed upon the pen by the cattle and other animals while eating and by the tractor in pushing the pen around under adverse circumstances such as mud and slush, the pen must be constructed sturdily in order to withstand such pressures. Use of two-inch oilfield pipe in the construction of such pens has been found to be very satisfactory.

In practice, the feeding pen 10 is placed around a stack of hay and each of the sides is interlocked as explained above. As the animals consume the hay and press inwardly for additional hay, the pressure of their bodies upon the side members 18 and/or 20 will reduce the area which the pen 10 encloses and make more hay available to the animals. Assuming that animals are pushing on both the side members 18 and 20, the side member 18 (and hence side members 14 and 16) will move in a direction opposite to the direction in which the side member 20 will move.

Although the size of the members comprising the pen 10 may be varied, a height for the vertical bars (22, 22a, 24 and 24a) of about 48 inches allows the hay, as it is consumed, to fall onto and be supported by the upper horizontal bars (32, 32a, 34 and 54) in such a manner that water-shedding thatch will be preserved and the hay will be protected from the weather until it is totally consumed. Placing the lower bars (30, 30a, 36 and 56) at a height of about 18 inches allows calves and other small animals to pass beneath them and be protected from trampling by older cows or other animals. The support given to the stack by the upper bars (32, 32a, 34 and 54) protects the calves and other small animals from having the stack fall on them.

The present invention, therefore, is well adapted to carry out the objects and attain the ends and advantages mentioned as well as others therein. While a presently preferred embodiment of the invention has been given for the purpose of disclosure, numerous changes may be made without departing from the spirit and scope of the invention as hereafter claimed.

What is claimed is:

1. A feeding pen for haystacks for use by cattle and other animals including,
   a. first and second opposed, skidmounted side members, each such side member including,
      i. first and second vertical bars,
      ii. a skid rail to which the first and second vertical bars (a) (i) are secured,
      iii. a first horizontal bar secured between and adjacent the top of the vertical bars (a) (i),
      iv. a second horizontal bar secured to and between the vertical bars (a) (i) and between the skid rail (a) (ii) and the first horizontal bar (a) (ii), and
      v. extensions placed above the vertical bars (a) (i) at one end of such bars,
   b. a third side member including first and second horizontal bars secured to the end of each of the first and second side members (a) which is located opposite the extensions (a) (v) and
   c. a fourth side member slideably attached to the first and second side members for sliding movement along substantially the entire length of the first and second side members and including
      i. first and second vertical bars,
      ii. a first horizontal bar secured to the top of both of the vertical bars (c) (i) and lockingly and slideably engaging the first and second side members (a), and
      iii. a second horizontal bar spaced below the first horizontal bar (c) (ii) and connected to the vertical bars (c) (i).

2. The invention of claim 1 wherein the first horizontal bar (5) (c) (ii) of the fourth side is attached to the first horizontal bar (5) (a) (iii) of the first and second side members by means of a slideable lock which includes
   a. a vertical bar connected to the first horizontal bar (5) (c) (ii) of the fourth side member at a point outside the first horizontal bar (5) (a) (iii) of one of the first and second side members,
   b. cylindrical attachments to the first horizontal bar (5) (c) (ii) of the fourth side member and the vertical bar (6) (a), and
   c. an "L"-shaped rod which is inserted into the attachments (6) (b) to complete the encirclement of the first horizontal bar (5) (a) (iii) of one of the first and second side members.

3. The invention of claim 2 wherein a piece of pipe is placed upon each of the vertical bars (5) (a) (i) of the first and second side members (5) (a) which are located away from the third side member (5) (b) and is used to hold the rod (6) (c) when not in use.

4. The invention of claim 1 wherein the third side member (5) (b) is disengageably connected to both the first and second side members (5) (a).

5. The invention of claim 4 wherein the connections between the third side member (5) (b) and one of the first and second side members (5) (a) include
   a. a male end portion on the end of one of the first and second horizontal bars of the third side member (5) (b),
   b. a rod connected to the vertical bar (5) (a) (i) of one of the first and second side members,
   c. a female receptacle located at the end of the rod (9) (b) for receiving the male end portion (9) (a), d. a disengageable lock for connecting the male end portion (9) (a) and the female receptacle (9) (c), and e. a diagonal bar secured to the rod (9) (b) and one of the horizontal bars (5) (a) (iii and iv).

6. The invention of claim 5 wherein the lock (9) (d) includes i. a hole through the male end portion (9) (a), ii. a hole through the female receptacle (9) (c), and iii. a pin inserted through the holes (10) (i and ii).

7. The invention of claim 1 wherein an additional bar is attached to the second horizontal bar of the third side member for the purpose of reinforcement.

8. The invention of claim 1 wherein vertical bars are attached between the first and second horizontal bars of the third side member (5) (b) and the first and second horizontal bars (5) (c) (ii and iii) of the fourth side member for the purpose of reinforcement.

9. The invention of claim 1 wherein extensions are placed upon the vertical bars (5) (a) (i) of the first and second side members which are located away from the third side member to prevent the fourth side member 5(c) from sliding off the first horizontal bars (5) (a) (iii) of the first and second side members.

* * * * *